United States Patent
Leiden et al.

(10) Patent No.: US 8,911,840 B2
(45) Date of Patent: Dec. 16, 2014

(54) COATED PIPE AND PROPYLENE POLYMER COMPOSITION THEREFOR

(75) Inventors: Leif Leiden, Andersbole (FI); Jouni Purmonen, Porvoo (FI); Kauno Alastalo, Porvoo (FI)

(73) Assignee: Borealis Technology Oy, Porvoo (FI)

( * ) Notice: Subject to any disclaimer, the term of this patent is extended or adjusted under 35 U.S.C. 154(b) by 155 days.

(21) Appl. No.: 12/919,779

(22) PCT Filed: Jan. 27, 2009

(86) PCT No.: PCT/EP2009/000517
§ 371 (c)(1),
(2), (4) Date: Sep. 7, 2010

(87) PCT Pub. No.: WO2009/106197
PCT Pub. Date: Sep. 3, 2009

(65) Prior Publication Data
US 2011/0003105 A1    Jan. 6, 2011

(30) Foreign Application Priority Data

Feb. 27, 2008 (EP) .................................... 08003577

(51) Int. Cl.
*B29D 22/00* (2006.01)
*C09D 123/10* (2006.01)
*C08L 23/16* (2006.01)

(52) U.S. Cl.
CPC ............... *C09D 123/10* (2013.01); *C08L 23/16* (2013.01); *C08L 2203/18* (2013.01)

USPC ................ 428/35.7; 428/36.92; 428/36.91; 427/409; 138/145

(58) Field of Classification Search
USPC ................ 428/36.91, 34.1, 35.7; 427/409; 138/145
See application file for complete search history.

(56) References Cited

U.S. PATENT DOCUMENTS 5,256,226 A * 10/1993 Marzola et al. ................ 156/95
5,565,051 A * 10/1996 Marzola et al. ................ 156/94

FOREIGN PATENT DOCUMENTS

EP    0579249 A2    1/1994
EP    1911825 A1    4/2008

OTHER PUBLICATIONS

International Search Report for PCT/EP2009/000517, dated Mar. 11, 2009.

* cited by examiner

*Primary Examiner* — Ellen S Raudenbush
(74) *Attorney, Agent, or Firm* — Milbank, Tweed, Hadley & McCloy LLP

(57) ABSTRACT

The invention relates to a coated pipe comprising a core, an adhesion layer coated on the core and an outer coating layer coated on the adhesion layer, wherein at least the adhesion layer comprises a propylene polymer composition comprising: (A) a propylene homo- or copolymer, and (B) an elastomeric component and to the use of such a propylene polymer composition for coating a pipe.

13 Claims, No Drawings

COATED PIPE AND PROPYLENE POLYMER COMPOSITION THEREFOR

This application is based on International Application PCT/EP2009/000517 filed Jan. 27, 2009, which claims priority to European Patent Application No. 08003577.7, filed on Feb. 27, 2008, the disclosures of which are herein incorporated by reference in their entireties.

The present invention relates to a propylene polymer composition for use in pipe coating, and a coated pipe comprising such a propylene polymer composition as an adhesive and/or coating layer.

Multi-layer structures comprising two or more layers are known from many applications such as the protective coating of pipes. In these multi-layer structures different layers mostly consist of different materials which have respective different physical and chemical properties. This results in the problem that adjacent layers do not or only adhere to each other to an insufficient extent. Therefore, it is commonly known to build up multi-layer structures with intermediate adhesive layers for improving the adhesion of adjacent layers consisting of different materials and thus, avoiding delamination.

Adhesive layers and materials for the production of such layers in the coating of metal pipes, which commonly comprise a three-layer polymer structure, i.e. a metal pipe core, an intermediate adhesive layer and an outer polyolefin protective layer, are known e.g. from WO 99/37730, disclosing an adhesive composition comprising an ethylene copolymer component and from 2 to 35 wt.-% of a grafted metallocene polyethylene. Such an adhesive composition shows improved adhesive properties which do not diminish over time.

Moreover, EP 1 316 598 A1 discloses an adhesive polymer composition comprising a non-elastomeric polyethylene in an amount of 40 to 97 wt.-% of the total composition and an elastomer wherein the non-elastomeric polyethylene has been produced in a process using a single-site catalyst and the non-elastomeric polyethylene or both the non-elastomeric polyethylene and the elastomer have been grafted with an acid grafting agent. Such an adhesive polymer composition shows improved adhesion properties, in particular when used as an adhesive layer for coating of pipes. It is observed that peel strength is improved at room temperature and the improvement still increases at higher temperatures.

However, in pipe technology, requirements vary substantially depending on the specific use of the pipe. Thus, especially severe requirements apply for material properties at low temperatures such as −20° C. or below and further, improvements in elongation at break and impact resistance are very demanding when such coated pipes are used at low temperature areas. If such requirements are not met, the pipes which are laid down at very low temperatures cannot stand bending of the pipe or external hits will cause that the whole coating layer will crack and be damaged. Therefore, it is the problem of the present invention to overcome the above deficiencies and draw backs and to provide an improved multi-layer composition in particular for use in the multi-layer structures such as coated pipes which are used at low temperature areas.

The present invention is based on the finding that this problem can be solved by adding an elastomeric component to a polypropylene used as a coating for pipes. Thus the present invention provides a coated pipe comprising a core, an adhesion layer coated on the core and an outer coating layer coated on the adhesion layer, wherein at least one of the adhesion layer and the outer coating layer comprises a propylene polymer composition comprising:

(A) a propylene homo- or copolymer, and
(B) an elastomeric component comprising an elastomeric ethylene copolymer.

The propylene polymer (A) may be a homopolymer or any copolymer such as a random, block or other copolymer. It is especially preferred that the propylene polymer (A) is a heterophasic polymer, wherein a propylene homo- or copolymer may form the matrix phase and a rubber component may form the disperse phase.

The propylene polymer composition used in the present invention not only shows improved adhesion properties at low temperatures, but it has been found out that modifying a propylene polymer based resin with an elastomeric component, the low temperature impact resistance of such a polymer composition used as an adhesive layer or protective coating for pipes is improved significantly. Moreover, it was surprisingly found out that the effect of an adhesive layer comprising the inventive propylene polymer composition may influence the whole coating. Thus, low temperature impact resistance of the whole coating structure of an coated pipe was improved and the peel strength before hits and after hits was sharply improved compared to conventional coated pipes using conventional adhesive layers. The peel strength is measured for the purposes of the present invention according to DIN 30678, if not otherwise indicated.

It was found out that the present invention shows a specific improved effect if the elastomeric component (B) is contained in the inventive propylene polymer composition in an amount of preferably not more than 30 wt.-%, more preferably 5 to 25 wt.-%, even more preferably 7 to 20 wt.-%, based on the total weight of the propylene polymer composition.

According to a preferred embodiment, the elastomeric component (B) may be a hydrocarbon rubber. In particular, the elastomeric component (B) may comprise an elastomeric ethylene copolymer. It is specifically preferred that the hydrocarbon rubber is an elastomeric ethylene copolymer. Specifically preferred examples of such elastomers include ethylene-propylene rubber, ethylene-propylene-diene rubber and ethylene-propylene-norbornadiene rubber. For the purposes of the present invention, an ethylene-propylene-diene rubber, such as EPDM terpolymer, is particularly preferred.

According to a further preferred embodiment of the present invention, the preferred heterophasic propylene copolymer (A) defined above may comprise:

(i) a propylene homo- or copolymer as a matrix phase and
(ii) an ethylene-propylene rubber as a disperse phase.

Such propylene polymers forming a matrix phase together with a rubber component as a disperse phase are usually addressed as heterophasic polymers.

The term "heterophasic polymer" used in the present invention encompasses all kinds of polymers wherein one polymer forms a matrix phase and another polymer is dispersed in the matrix phase as a disperse phase. It is further preferred that the elastomeric component of the heterophasic propylene polymer (A) preferably a rubber component, forms the disperse phase. The term "rubber component" is well known in the art and means herein any elastomeric component which is capable of forming the disperse phase in the above matrix phase. It is preferred that the rubber component is an hydrocarbon rubber as defined above.

Preferably, the elastomeric component of the heterophasic propylene polymer (A) is produced separately in a multi-stage process in the presence of matrix phase as described herein below. Thus, the matrix phase may be produced first as a multi-stage process wherein fractions thereof may be produced in two or more reactors which may be the same or different and, optionally, under the same or different polymerisation conditions or, alternatively, in one reactor by changing the catalyst and/or polymerisation conditions. If desired, the polymerisation process may include a pre-polymerisation step in a manner known in the art.

Without limiting the invention to any process, the elastomeric component may preferably be produced as a further process step after the formation of the matrix phase in the same multi-stage process system as the matrix phase. Accordingly, after the formation of the matrix phase, the elastomeric component is preferably produced in the subsequent one or more reactor(s), preferably at least in one gas phase reactor in the presence of the matrix phase. Such elastomeric or rubber processes are known in the art.

The propylene homo- or copolymer (A) may be produced by using any suitable polymerisation catalyst well known in the art.

It is specifically preferred that at least one adhesive layer of the coated pipe according to the present invention comprises components (A) and (B) as described above. In addition to these components, conventional additives may also be present in the composition in small amounts preferably up to at most 4 wt. %. For example, an antioxidant may be present in the composition in an amount of at most 10,000 ppm, more preferably at most 5,000 ppm and most preferably at most 3,000 ppm.

It is preferred that the above adhesive layer of the coated pipe apart from the conventional additives consists of components (A) and (B), i.e. that no further polymer components before or after polymerisation are added.

The polypropylene component of such an adhesive layer may be modified, at least partially with an acid grafting agent, in order to improve the adhesive properties. Typical examples of such grafting agents are unsaturated carboxylic acids or derivatives thereof, such as anhydrides, esters and salts. Preferably the unsaturated group is in conjugation with the carboxylic group. Examples thereof are acrylic acid, methacrylic acid, fumaric acid, maleic acid, nadic acid, citraconic acid, itaconic acid, crotonic acid, and their anhydrides, salts (metallic and non-metallic), esters, amides and imides. In particular preferred are maleic acid and derivatives, in particular the anhydride.

Conventional additives may be added before or after polymerisation.

The present invention also relates to the use of the propylene polymer composition as defined above for the production of a coated pipe in which said polymer composition is especially superior in elongation at break and impact resistance as well as peel strength before and after hit under low temperature conditions.

In such a pipe, the propylene polymer composition may form an adhesive coating and/or a further outer coating on the adhesive layer to improve compatibility between various layers. The effects of the present invention are especially apparent if the outer coating layer is the outermost coating layer, a so-called top coat layer.

In a preferred embodiment, the adhesive layer in the coated pipe is adjacent to a polyolefin layer.

The present invention in particular relates to a multi-layer pipe, i.e. a pipe comprising a multi-layer coating with two, three, four, five or more layers, which comprises a polyolefin layer and an adhesive layer adjacent to the polyolefin layer which may comprise the inventive propylene polymer composition as described above.

In a preferred embodiment of the present invention the above described propylene polymer composition is comprised in both an adhesive layer and an outer coating layer applied on the core of the coated pipe. The core may be a polymeric or non-polymeric core. Especially preferred are such propylene polymer compositions in the adhesive coating on a metal core and in a top coat layer. The core of the pipe may be made of a metal such as steel or of a fiber-reinforced material such as polymers reinforced with fibers, e.g. carbon fibers or glass fibers.

In a preferred embodiment, the present invention also relates to a coated pipe, comprising the above adhesive layer and outer coating layer, wherein a layer of a polar polymer, in particular an epoxy layer, is provided on the core and on which the above adhesive layer is applied. In particular, the present invention also relates to a metal pipe with a three-layer protective coating consisting of an inner coating layer, such as e.g. the above polar polymer or epoxy layer, an intermediate adhesive layer and an outer coating layer, wherein both the intermediate adhesive layer as well as the outer coating layer comprise a propylene polymer composition according to the present invention. Irrespective of the number of the coating layers on the core, it is specifically advantageous to provide at least one adhesive layer and outer coating layer on the adhesive layer which both comprise the above propylene polymer composition.

Furthermore, the present invention relates to the use of the above-described propylene polymer composition preferably for the coating of a metal pipe having at least a three-layer protective coating as described above.

The coated pipe according to the present invention, which comprises the propylene polymer composition in at least one of the adhesive layer and an outer coating layer, preferably in both layers, shows marked improvement in various mechanical properties. Especially, elastomer modified propylene polymers according to the present invention preferably and surprisingly achieve an elongation at break, measured at −20° C. according to ISO 527-2 of at least 50%, more preferably at least 80%, even more preferably at least 100% which is a sharp improvement compared to a conventional pipe coating wherein respective conventional polyolefin resins do not contain an elastomeric component (B) as in the present invention.

By only adding an elastomer into the propylene polymers of an adhesive layer used in the inventive pipes, impact resistance can be improved considerably. Moreover it was surprisingly found out that in the impact test described below, the failure mode caused less damage to the coating. In conventional materials one will find rapid crack propagation, delamination in the interface primer-adhesive or a so called "butterfly" failure. In the prior art materials heavy impacts often caused so serious damages that the whole pipe needs to be re-coated. These drawbacks could surprisingly be overcome by the new propylene polymer composition used for coating the pipes of the present invention.

Moreover, the coated pipe preferably exhibits an impact resistance, at −20° C. of 15 to 40 J/mm coating thickness, preferably from 24 to 40 J/mm measured according to EN 1411 with the following modifications: The pipes have been kept in a refrigerator or deep-freeze to obtain the desired temperature for 24 hours or more. The pipes have a diameter of 114 mm, a wall thickness of 8 mm and a total coating thickness of 3.6 mm. In order to avoid any flexibility in the steel heavy weight pipes were tested. The indenter used for the tests had a hemispherical end and a diameter of 25 mm according to the standard procedure. In the tests a falling weight of 6 kg and various heights between 0.6 m and 2 m giving impact energies per mm coating thickness between 9.7 J and 32.4 J were used.

Moreover, the coated pipe preferably exhibits a peel strength according to DIN 30678 of from 300 to 700 N/cm, preferably 400 to 700 N/cm before hit and a peel strength of from 150 to 450 N/cm, preferably 200 to 450 N/cm, even more preferably 250 to 450 N/cm after hit. This means that even after impact the pipe is able to maintain substantially its peel strength and will not loose or break its coating it was further found out that even under relatively high impact energies within the above range, the peel strength results were acceptable. At rather low impact energies, no influence on the peel strength was observed.

Definitions and Determination Methods

The following definitions for the used terms as well as the determination methods for the characterizing values/parameters used herein to describe the propylene polymer composition of the invention and the properties thereof apply generally for the description part above and for the examples below, unless otherwise stated.

EXPERIMENTAL AND EXAMPLES

1. Definitions and Measurement Methods a) Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The MFR is determined at 190° C. for polyethylene and at 230° C. for polypropylene. It may be determined at different loadings such as 2.16 kg ($MFR_2$), 5 kg ($MFR_5$) or 21.6 kg ($MFR_{21}$).

b) Peel Strength (Bond Strength)

Adhesion of polymer on steel was tested by Instron 1122 peel strength test equipment according to DIN 30678. A strip of 3 cm width is cut off the coating layer. The other end of the strip is fastened to pulling equipment and the pulling strength is measured during the peeling of the strip from the steel with a pulling speed of 10 mm/min. The results are expressed as N per cm.

Peel strength was measured at room temperature (20° C.) before and after hit by the modified falling weight impact test according to EN⁻ 1411 described below. As soon as the pipe had reached room temperature (after hit), the same peel strength test as described above was repeated over the impact area.

c) Falling Weight Impact Resistance for Peel Strength Measurement

The test was performed according to EN 1411 with the following modifications. After a peel-strength test at room temperature, a coated pipe was deep frozen for 24 hours at −10° C. Subsequently, the pipe was immediately taken to the falling weight test for determining the impact resistance. In the tests a falling weight (indenter having a hemispherical end, a diameter of 25 mm and a weight of 6 kg) was made to impact on the coated pipe from an altitude of 2.0 m. This corresponds to an impact energy of 32.4 J/mm coating thickness.

d) Elongation at Break

Elongation at break was measured at −20° C. with a 50 mm/min pulling speed according to ISO 527-2, where compression molded specimen type 1A were used.

e) Xylene Solubles

XS (xylene solubles) were analyzed by the known method: 2.0 g of polymer was dissolved in 250 ml p-xylene at 135° C. under agitation. After 30±2 minutes the solution was allowed to cool for 15 minutes at ambient temperature and then allowed to settle for 30 minutes at 25±0.5° C. The solution was filtered with filter paper into two 100 ml flasks.

The solution from the first 100 ml vessel, was evaporated in nitrogen flow and the residue dried under vacuum at 90° C. until constant weight is reached. The ratio of xylene solubles in the polymer sample was determined according to the following formula:

$$XS(\%)=(100 \times m_1 \times v_0)/(M_0 \times v_1), \text{ wherein}$$

$m_0$=initial polymer amount (g),
$m_1$=weight of residue (g),
$v_0$=initial volume (ml),
$v_1$=volume of analyzed sample (ml).

g) Comonomer Content

Comonomer content (wt %) was determined based on Fourier transform infrared spectroscopy (FTIR) determination calibrated with $^{13}$C-NMR.

i) Weight %

The percentages are expressed in % which indicates weight % (wt. %), if not indicated otherwise.

The present invention will now be described by way of examples: The raw materials are e.g. commercially available or can be produced according or analogously to the known methods described in literature, unless otherwise specified.

k) Materials Used

Sample 1 (Top Coat)

Heterophasic propylene copolymer, homopolymer matrix

| ethylene content | 8% |
| $MFR_2$ | 0.9 g/10 min. |
| Xylene soluble (=rubber) | 13% |
| Ethylene content in rubber phase | 40% |
| No elastomer content | |

Sample 2 (Elastomer Modified Top Coat)

| Sample 1 | 93% |
| elastomer content (EPDM) | 7% |

Sample 3 (Elastomer Modified Top Coat)
Heterophasic Propylene Copolymer, Homopolymer Matrix

| ethylene content | 8% |
| $MFR_2$ | 0.4 g/10 min. |
| Xylene soluble (=rubber) | 14% |
| Ethylene content in rubber phase | 40% |
| elastomer content (EPDM) | 18% |

Sample 4 (Adhesive)
Heterophasic Propylene Copolymer

| ethylene content | 11% |
| $MFR_2$ | 7.5 g/10 min. |
| XS (rubber content) | 15% |
| Contains maleic acid anhydride | 0.12% |
| No elastomer content | |

Sample 5 (Elastomer Modified Adhesive)

| Sample 4 | 90% |
| elastomer content | 10% |

Elastomeric Component

Semi-crystalline low diene-containing ethylene-propylene-diene terpolymer (EDPM) with narrow molecular weight distribution Properties:
Mooney viscosity $ML_{1+4}$ (125° C.): 45 (ASTM D 1646)
Polymer composition (wt. %)
Ethylene: 70 (ASTM D 3900)
Propylene: 30.5 (ASTM D 3900)
Ethylidenenorbornene: 0.5 (ASTM D 6047)

For preparing coated pipes according to the Examples and Comparative Examples the following coating procedure was applied.

Steel pipes were provided having a diameter of 114 mm and a wall thickness of 8 mm. First a coating of an epoxy primer (Scotchkote® 226N from 3M) was applied by spray coating while rotating the steel pipe at a coating speed of 10 m/min, a temperature in the range of 180-200° C., and a coating thickness of 100 μm. Thereafter the adhesive layer and a polypropylene outer layer were coextruded at temperatures between 220 and 250° C., obtaining a layer thickness for the adhesive layer of 250 μm and of 3.6 mm for the outer layer. Using a silicone pressure roller the coextruded layers were pressed onto the steel pipe in order to remove air bubbles.

The results for compositions made from the samples given above are indicated in the table below.

TABLE 1

| Example | Formulation | Impact resistance (J/mm) | Peel strength (N/cm) Before hit | After hit |
|---|---|---|---|---|
| Example 1 | Sample 5+ Sample 1 | 32 | 410 | 270 |
| Comparative Example 1 | Sample 4+ Sample 2 | 10 | 483 | 0 |
| Example 2 | Sample 5+ Sample 2 | 26 | 450 | 300 |
| Comparative Example 2 | Sample 4+ Sample 1 | 10 | 438 | 0 |
| Comparative Example 3 | Sample 4+ Sample 3 | 10 | 350 | 0 |

0 means that the coating got loose and broken when it was hit

Elongation at break was measured at −20° C. according to ISO 527 under the above conditions with Samples 1, 2, 4 and 5 specified above to verify the influence of the elastomer in the compositions. The following results were obtained.

TABLE 2

| Sample | Elongation at break (%) |
|---|---|
| Sample 1 (comparative) | 40 |
| Sample 2 (inventive) | 114 |
| Sample 4 (comparative) | 57 |
| Sample 5 (inventive) | 160 |

The results of the inventive examples compared to the comparative examples clearly show that a coated pipe comprising the coating polymer composition of the present invention is sharply improved in impact resistance, peel strength before and after hit at temperatures of −20° C. or below and in impact resistance at −20° C. Furthermore the failure mode after excessive impact was less damaging for the whole coating, thus extending the lifetime of the coated pipes. Consequently, the polyolefin coated pipes of the present invention provide an optimisation of the property profile achieving particularly improved impact strength, peel strength as well as bending strength leading to an extended lifetime with less maintenance of the coated pipes which also brings about a substantial save of costs.

The invention claimed is:

1. A coated pipe comprising a core, an adhesion layer, and an outer coating layer, wherein the adhesion layer is intermediate the core and the outer coating layer, wherein the adhesion layer and the outer coating layer comprise a propylene polymer composition comprising:
   (A) a propylene copolymer, and
   (B) an elastomeric component;
   wherein the elastomeric component is an elastomeric ethylene copolymer;
   wherein the coated pipe has an impact resistance at −20° C. of 15 to 40 J/mm according to EN 1411; and
   wherein the propylene copolymer (A) comprises an ethylene content of about 8% in the outer coating layer and about 11% in the adhesion layer.

2. The coated pipe according to claim 1, wherein the propylene polymer (A) is a heterophasic propylene copolymer.

3. The coated pipe according to claim 1, wherein the elastomeric component (B) is contained in an amount of not more than 30 wt %, based on the weight of the propylene copolymer (A).

4. The coated pipe according to claim 2, wherein the heterophasic propylene copolymer comprises:
   (A) a propylene copolymer as a matrix phase; and
   (B) a rubber component as a dispersed phase.

5. The coated pipe according to claim 1, wherein the elastomeric component (B) is a hydrocarbon rubber.

6. The coated pipe according to claim 5, wherein the hydrocarbon rubber is selected from the group consisting of an ethylene-propylene rubber, an ethylene-propylene-diene rubber, and an ethylene-propylene norbornadiene rubber.

7. The coated pipe according to claim 1, wherein the pipe core is made of steel or a fiber reinforced material.

8. The coated pipe according to claim 1, wherein a layer of a polar polymer is provided on the core.

9. The coated pipe according to claim 8, wherein the layer of the polar polymer is an epoxy layer.

10. The coated pipe according to claim 1, wherein the pipe exhibits a peel strength of from 300 to 700 N/cm before hit and from 150 to 450 N/cm after hit according to DIN 30678.

11. The coated pipe according to claim 1, wherein the propylene polymer composition exhibits an elongation at break of 50% or more according to ISO 527-2.

12. A method of manufacturing a coated pipe comprising a core, an adhesion layer and an outer coating layer, wherein the adhesion layer is intermediate the core and the outer coating layer, wherein the adhesion layer and the outer coating layer comprise a propylene polymer composition comprising:
   (A) a propylene copolymer, and
   (B) an elastomeric component
   wherein the elastomeric component is an elastomeric ethylene copolymer;
   wherein the coated pipe has an impact resistance at −20° C. of 15 to 40 J/mm according to EN 1411; and
   wherein the propylene copolymer (A) comprises an ethylene content of about 8% in the outer coating later and about 11% in the adhesion layer.

13. The coated pipe according to claim 1, wherein the outer coating layer is the outermost coating layer.

* * * * *